United States Patent
Augst

(10) Patent No.: US 10,794,707 B2
(45) Date of Patent: Oct. 6, 2020

(54) METHOD FOR PROCESSING DATA OF A ROUTE PROFILE, DECODING METHOD, CODING AND DECODING METHOD, SYSTEM, COMPUTER PROGRAM, AND COMPUTER PROGRAM PRODUCT

(71) Applicant: Bayerische Motoren Werke Aktiengesellschaft, Munich (DE)

(72) Inventor: Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 265 days.

(21) Appl. No.: 15/397,783

(22) Filed: Jan. 4, 2017

(65) Prior Publication Data
US 2017/0115120 A1    Apr. 27, 2017

Related U.S. Application Data

(63) Continuation of application No. PCT/EP2015/065310, filed on Jul. 6, 2015.

(30) Foreign Application Priority Data

Jul. 9, 2014    (DE) .......................... 10 2014 213 326

(51) Int. Cl.
*G01C 21/20* (2006.01)
*G01C 7/04* (2006.01)
(Continued)

(52) U.S. Cl.
CPC .............. *G01C 21/20* (2013.01); *G01C 7/04* (2013.01); *G01B 21/30* (2013.01); *G01C 21/26* (2013.01)

(58) Field of Classification Search
CPC .... G01C 21/3492; G01C 21/32; G01C 21/36; G01C 21/30; G01C 21/3407;
(Continued)

(56) References Cited

U.S. PATENT DOCUMENTS

| | | | |
|---|---|---|---|
| 5,065,618 A * | 11/1991 | Hodges, Sr. ............. | G01C 7/04 33/521 |
| 2003/0000097 A1* | 1/2003 | Docros ................... | E01C 23/01 73/146 |

(Continued)

FOREIGN PATENT DOCUMENTS

| DE | 600 19 799 T2 | 5/2006 |
|---|---|---|
| DE | 10 2006 057 342 A1 | 6/2008 |

(Continued)

OTHER PUBLICATIONS

International Search Report (PCT/ISA/210) issued in PCT Application No. PCT/EP2015/065310 dated Oct. 23, 2015 with English translation (Four (4) pages).

(Continued)

*Primary Examiner* — Alexander G Kalinowski
*Assistant Examiner* — Sanjeev Malhotra
(74) *Attorney, Agent, or Firm* — Crowell & Moring LLP

(57) ABSTRACT

In a method for processing data of a route profile, which represent local physical roadway properties of a route segment, position information is determined, which is representative of a global position of the route segment. Route profile data are determined, which are representative of local physical roadway properties of the route segment. A spectral distribution is determined in dependence on the route profile data, with regard to a quantity that represents location information. The spectral distribution is associated with the position information.

28 Claims, 1 Drawing Sheet

(51) Int. Cl.
*G01B 21/30* (2006.01)
*G01C 21/26* (2006.01)

(58) Field of Classification Search
CPC ............ G01C 21/3415; G01C 21/3469; G01C 21/3694; G01C 21/3691; G01C 21/3697; G01C 21/28; G01C 21/34; G01C 21/3461; G08G 1/096827; G08G 1/0129; G08G 1/0104; G08G 1/096716; G08G 1/096888; G08G 1/093; G08G 1/096741; G08G 1/052; G08G 1/096775; G08G 1/096816; G08G 1/096844; G08G 1/0125; G08G 1/0967; G08G 1/09675; G08G 1/096822; G08G 1/096866; G08G 1/20; G08G 1/0133; G08G 1/096811; G08G 1/096838; G08G 1/00; G08G 1/096861; G08G 1/096872; G08G 1/096883; G08G 1/166; H04W 4/025; H04W 4/029; H04W 64/00; H04W 4/02; H04W 88/005; G06N 5/04; H04B 1/3822; G01S 1/026; G01S 1/028; G01S 2205/006; G01S 2205/008; G01S 5/0009; G01S 5/0018; G01S 5/0054; G01S 5/02; G01S 5/0205; G01S 5/021; G01S 5/0252; G01S 5/0257; G01S 5/06; G01S 5/0278; G06Q 10/04; G06Q 30/0207; G06Q 30/0215; G06Q 30/0261; G06Q 50/01; H04L 67/18; B61L 25/025; G06F 17/30241; G09B 29/106; Y02D 30/20
USPC .......... 701/1, 31.4, 117, 119, 300, 409, 410, 701/532, 533, 22, 41; 700/30; 705/14.58; 455/456.1; 342/457; 340/539.13, 905, 995.1
See application file for complete search history.

(56) References Cited

U.S. PATENT DOCUMENTS

| | | | | |
|---|---|---|---|---|
| 2003/0055555 A1* | 3/2003 | Knockeart | ....... | G08G 1/096811 342/357.31 |
| 2003/0146871 A1* | 8/2003 | Karr | .......... | G01S 5/02 342/457 |
| 2003/0222820 A1* | 12/2003 | Karr | .......... | G01S 1/026 342/457 |
| 2004/0198386 A1* | 10/2004 | Dupray | ........ | H04W 64/00 455/456.1 |
| 2006/0158330 A1* | 7/2006 | Gueziec | ........ | G08G 1/096816 340/539.13 |
| 2006/0276201 A1* | 12/2006 | Dupray | .......... | H04L 67/18 455/456.1 |
| 2007/0013551 A1* | 1/2007 | Gueziec | .......... | G08G 1/096716 340/905 |
| 2007/0063875 A1* | 3/2007 | Hoffberg | ........ | G01C 21/28 340/995.1 |
| 2007/0293958 A1* | 12/2007 | Stehle | ........ | G06Q 30/0207 700/30 |
| 2008/0004789 A1* | 1/2008 | Horvitz | .......... | G01C 21/3492 701/117 |
| 2008/0004802 A1* | 1/2008 | Horvitz | .......... | G01C 21/3415 701/533 |
| 2008/0183376 A1* | 7/2008 | Knockeart | ....... | G08G 1/096861 701/119 |
| 2009/0002195 A1* | 1/2009 | Horvitz | ........ | G08G 1/0104 340/934 |
| 2010/0049397 A1* | 2/2010 | Liu | ........ | G01C 21/3469 701/31.4 |
| 2010/0057346 A1* | 3/2010 | Ehrlacher | ........ | G01C 21/3461 701/533 |
| 2010/0063734 A1* | 3/2010 | Kumar | ........ | B61L 25/025 701/300 |
| 2010/0145567 A1* | 6/2010 | Bian | ........ | B60T 8/172 701/31.4 |
| 2010/0299055 A1* | 11/2010 | Hilbrandie | ....... | G08G 1/096888 701/532 |
| 2010/0299064 A1* | 11/2010 | Hilbrandie | ........ | G08G 1/0104 701/533 |
| 2011/0153129 A1* | 6/2011 | Gray, Jr. | ........ | F16H 61/0213 701/22 |
| 2011/0184588 A1* | 7/2011 | Brusilovsky | ....... | G01C 21/3407 701/1 |
| 2011/0307165 A1* | 12/2011 | Hiestermann | ...... | G01C 21/3492 701/119 |
| 2012/0323404 A1* | 12/2012 | Brusilovsky | ........ | G08G 1/20 701/1 |
| 2013/0030690 A1* | 1/2013 | Witmer | ........ | G09B 29/106 701/409 |
| 2013/0030692 A1* | 1/2013 | Hagan | ........ | G06F 16/29 701/410 |
| 2013/0079990 A1* | 3/2013 | Fritsch | ........ | G06T 7/11 701/41 |
| 2013/0245943 A1* | 9/2013 | Hiestermann | ...... | G01C 21/3492 701/533 |
| 2013/0281115 A1* | 10/2013 | Dupray | ........ | H04W 4/025 455/456.1 |
| 2013/0304367 A1* | 11/2013 | Stehle | ........ | G06Q 30/0215 701/117 |
| 2014/0074388 A1* | 3/2014 | Bretzigheimer | ....... | B62D 6/006 701/117 |
| 2014/0091950 A1* | 4/2014 | Gueziec | ........ | G06N 5/04 340/905 |
| 2014/0107923 A1* | 4/2014 | Gueziec | .......... | G01C 21/3694 701/533 |
| 2014/0188390 A1* | 7/2014 | Tuukkanen | ........ | G01C 21/3492 701/533 |
| 2014/0222321 A1* | 8/2014 | Petty | ........ | G01C 21/3492 701/117 |
| 2014/0236483 A1* | 8/2014 | Beaurepaire | ........... | G08G 1/168 701/533 |
| 2015/0019042 A1* | 1/2015 | Poechmueller | ....... | B60W 30/02 701/1 |
| 2015/0081444 A1* | 3/2015 | Hoffberg | ........... | G01C 21/3415 705/14.58 |
| 2015/0292897 A1* | 10/2015 | Aldereguia | ........ | G01C 21/3469 701/410 |
| 2015/0308847 A1* | 10/2015 | Hilbrandie | ........ | G08G 1/096888 701/119 |
| 2016/0171521 A1* | 6/2016 | Ramirez | .......... | G08G 1/096827 701/409 |
| 2016/0221592 A1* | 8/2016 | Puttagunta | ........... | B61L 25/04 |
| 2017/0219364 A1* | 8/2017 | Lathrop | ........ | G01C 21/3453 |

FOREIGN PATENT DOCUMENTS

DE 10 2012 009 674 A1 9/2013
EP 0 556 070 A2 8/1993

OTHER PUBLICATIONS

German-language Written Opinion (PCT/ISA/237) issued in PCT Application No. PCT/EP2015/065310 dated Oct. 23, 2015 (Six (6) pages).

German-language Search Report issued in counterpart German Application No. 10 2014 213 326.2 dated Mar. 17, 2015 with partial English translation (Eleven (11) pages).

* cited by examiner

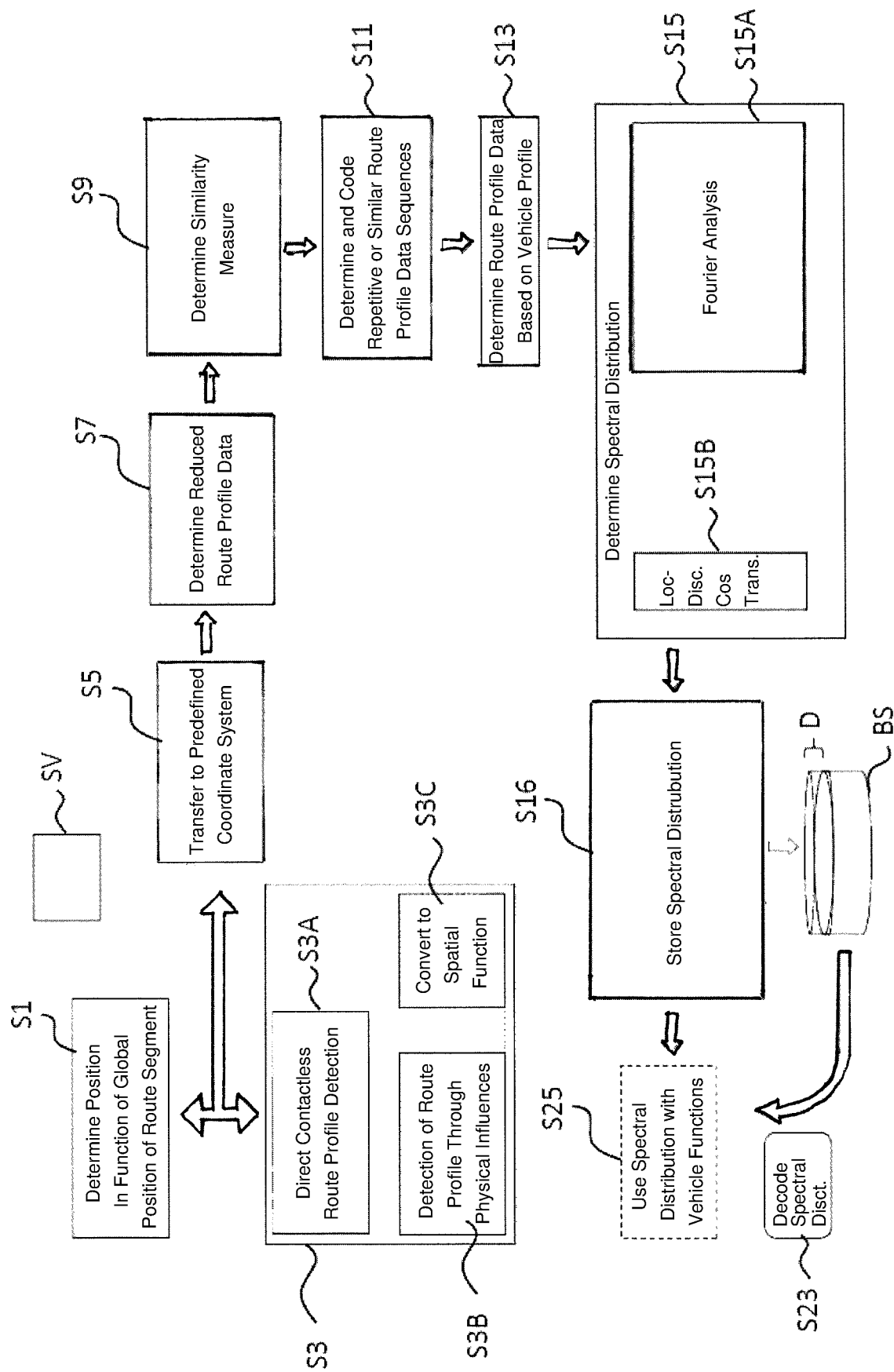

METHOD FOR PROCESSING DATA OF A ROUTE PROFILE, DECODING METHOD, CODING AND DECODING METHOD, SYSTEM, COMPUTER PROGRAM, AND COMPUTER PROGRAM PRODUCT

CROSS REFERENCE TO RELATED APPLICATIONS

This application is a continuation of PCT International Application No. PCT/EP2015/065310, filed Jul. 6, 2015, which claims priority under 35 U.S.C. § 119 from German Patent Application No. 10 2014 213 326.2, filed Jul. 9, 2014, the entire disclosures of which are herein expressly incorporated by reference.

BACKGROUND AND SUMMARY OF THE INVENTION

The invention relates to a method for processing data of a route profile. The invention furthermore relates to a decoding method. The invention furthermore relates to a coding and decoding method. The invention furthermore relates to a system, a computer program, and a computer program product.

There is a need for a method and a system which contribute to particularly efficient processing of data of a route profile which represent local physical properties of a route profile.

The invention is distinguished by a method for processing data of a route profile which represent local physical roadway properties of a route segment. The invention is furthermore distinguished by a system which corresponds to the method for processing data of the route profile. Position information is determined, which is representative of a global position of the route segment. Route profile data are determined, which are representative of physical roadway properties of the route segment. Depending on the route profile data, a spectral distribution is determined, in relation to a variable that represents location information. The spectral distribution is assigned to the position information.

By determining the spectral distribution, it is possible for data that are inherently extremely extensive, such as, for example, a distribution of parameters, such as, for example, height differences over a route, to be brought into a very compact form.

The spectral distribution with the assigned position information can subsequently be transmitted, for example, to a server and/or a vehicle, for example, in the form of a continuous transmission as a data stream, for example. In particular, the transmission comprises a wireless transmission in the form of a plurality of data packets. In this case, the data can be divided into data packets preferably depending on the relation of the data to specific route profiles.

Alternatively or additionally, the spectral distribution with the assigned position information can subsequently be stored permanently.

Alternatively or additionally, the spectral distribution with the assigned position information can be processed further for example in the context of an indicating function and/or in the context of a driver assistance function of a vehicle, wherein a variable in the vehicle, in particular a variable which influences the longitudinal dynamics and transverse dynamics or vertical dynamics of the vehicle, is controlled depending on the spectral distribution with the assigned position information.

The spectral distribution is determined in particular by way of a time-discrete Fourier analysis, in particular by use of a Fourier transformation. Fourier transformation here denotes in summary a method of Fourier analysis which allows continuous, aperiodic signals to be decomposed into a continuous spectrum. The function that describes this spectrum is also referred to as a Fourier transform or spectral function. Determining the spectral distribution substantially comprises forming a spectral function preferably with discrete forms of Fourier analysis, for example by use of a fast Fourier transformation (FFT), a cosine transformation and/or a modified discrete cosine transformation (MDCT), in particular in a manner resolved with respect to a location.

The route profile data are representative, in particular, of a progression of a physical roadway property relative to the variable that represents the location information.

The route segment can preferably be road or traffic lanes. Alternatively or in addition, the route segment can be arbitrarily shaped and extended terrain or ground with or without artificially created features, e.g. of an infrastructure.

Preferably, the local physical roadway properties comprise at least one local distribution of predefined geometrical variables within the route segment. These can preferably comprise at least one distribution of specific surface properties, preferably a height profile. Furthermore, the processing of further permanent or time-dependent variables that identify a route segment is possible and advantageous.

The physical roadway properties can preferably relate to a route segment or to a part of a route profile or of a route having a horizontal extent of, for example, 0-100 meters, particularly preferably to approximately 10 meters.

In accordance with one advantageous configuration, the method comprises determining an asynchronous function that represents the route profile data.

In this case, e.g. a significant portion of the, e.g. sensor-detected, route profile data that represents local physical roadway properties can also be determined or transferred in the form of an asynchronous function, which preferably relates to a variable representing the location information. In this case, the asynchronous function can preferably represent the differences between local roadway properties and a reference variable.

In this case, the asynchronous function can be discrete or continuous and represent a difference between a quantitative variable that is representative of local physical roadway properties of the route segment and a reference variable. In this case, the reference variable can represent a synchronous proportion of the data that is possibly present, preferably an additive direct proportion of the route profile data of the route segment. Such a synchronous proportion can relate to global e.g. average or statistical physical roadway properties within a route or the route segment.

In this case, the reference variable can be variable in a location-dependent manner or itself be represented as a function of a variable that represents location information. Preferably, such a reference variable can be determined depending on an integral and/or mean and/or low-pass-filtered value of the local physical property within a route profile. Alternatively or additionally, the reference variable, in particular a plurality of values for different route segments, can be assigned to the corresponding spectral distribution or to the corresponding position information.

Consequently, an advantageous, in particular direct applicability of the Fourier analysis to the route profile data also arises. The corresponding values of the reference variable (of the respective direct proportion possibly present) can be processed further, stored or transmitted together with or separately from the spectral distribution determined, depending on the variable that represents location information.

Depending on the type of route profile data or the manner in which they are determined, e.g. by use of a sensor, these data can already be present as an asynchronous function. Therefore, transferring the route profile data in the form of such an asynchronous function can be carried out depending on the type of route profile data and/or the method with which they are determined.

The position information can comprise a position of the route segment in a global coordinate system, e.g. GPS, Galileo, etc. Moreover, the position information can also preferably comprise an alignment within the route segment in relation to a world coordinate system or according to cardinal points, etc. The position information can for example also additionally comprise a position and/or alignment of a respective local physical property in relation to lane markers and/or infrastructure devices (e.g. crash barriers), in particular within a route segment, which relate here in particular to one or more prominent points and/or lines and/or shapes of the route segment. By way of example, this information can also comprise a relative position with a reference to the lane center of a road segment.

The assignment to the position information can be established for example in such a way that for each route segment of less than e.g. approximately 10 meters, 20 meters, 30 meters, 100 meters, with respect to which the spectral distribution was determined, at least one piece of information is assigned to the position information, such as, for example, the global position, and/or for each route segment of less than e.g. 1 meter, 2 meters, 3 meters, 10 meters, at least one piece of information is assigned to the position information, such as, for example, a relative position of the route segment.

The assignment can preferably be carried out by an incorporation of a plurality of data representing the position information into the data or data packets obtained from the spectral distribution. The reference can also be effected by use of a linking or a look-up table or a predetermined assignment function between the data representing the spectral distribution and the data representing the corresponding position information.

By way of example, for the assignment, data for the spectral distribution and data that represents associated position information representing the same route segment in each case are stored or processed further together or in assigned files or data packets. These data can comprise a discrete set of spectral distributions which e.g. predominate or exceeds a predetermined threshold in a route segment.

The spectral distribution determined can be used, for example, to compensate for vehicle vibrations in the case of road unevennesses in order to increase comfort.

The spectral distribution determined can alternatively or additionally be used for a chassis conditioning with regard to unevennesses and particular features of the route segment along which the vehicle is currently traveling, for example for the control of individual valves of a vertical dynamics actuator system or a further actuator system of the vehicle. In the case of such a use of the spectral distribution, it is possible to take account of concrete local physical properties of the route segment, including their respective concrete position information, in the regulating processes in a vehicle which refer to their respective position.

The spectral distribution determined can alternatively or additionally be used for increasing comfort or safety, in particular for avoidance of specific route properties that together form specific artefacts, such as, for example, of potholes, sloping road segments and the like. In this case, a targeted, in particular at least partly automatic avoidance of the effects of such artefacts on the passenger cell of a vehicle or on the vehicle can be carried out even if they are not visible, e.g. are concealed or covered e.g. by water or snow.

The spectral distribution determined can alternatively or additionally be used for a comfortable or safe steering wheel feedback and/or decoupling for example by virtue of the fact that road unevennesses do not turn the steering wheel and the driver of the vehicle obtains an appropriate pleasant feedback. This is done, for example, by virtue of the steering wheel feedback and/or decoupling being controlled depending on the spectral distribution.

The spectral distribution determined can alternatively or additionally be used to determine a section, in particular an off-road section, having desired physical roadway properties for a driver of a vehicle.

The spectral distribution determined can alternatively or additionally be used for a direct or indirect exchange with other vehicles.

The spectral distribution determined can alternatively or additionally be used for storing an empirical value of a vehicle with varying loading or a plurality of vehicles of different designs.

The spectral distribution determined can alternatively or additionally be used for a future vehicle optimization. In this case, data sets, e.g. parameter sets for the chassis of the vehicle, can which are determined or assigned depending on the spectral distribution, wherein the behavior of the vehicle is optimized in a predefined manner taking account of concrete route profile data, in particular concrete local physical properties at their respective position. In this case, these functions of a vehicle are performed and/or controlled or regulated depending on data that are determined from the spectral distribution and preferably from the position information assigned thereto.

Moreover, design measures for the next generation of the vehicle can be derived or optimized depending on the spectral distribution determined.

In accordance with one advantageous configuration, the spectral distribution is representative of a spatial frequency distribution.

As a result, the spectral distribution directly represents spatial frequencies, such that the data of the spectral distribution can be used, if appropriate, without further conversion.

In accordance with a further advantageous configuration, the spectral distribution is representative of a temporal frequency distribution.

Moreover, a combination of a plurality of spectral distributions is advantageous, which are determined depending on the same or a different type or class of local physical route properties. In this case, at least one spectral distribution can be at least partly representative of a spatial frequency distribution and another be representative of a temporal frequency distribution. A determination of at least one spectral distribution which is representative of a spatial frequency distribution depending on a spectral distribution which is representative of a temporal frequency distribution, or vice versa, e.g. in a back-end computer, is also advantageous.

In accordance with a further advantageous configuration, the spectral distribution is assigned to the position information by means of a predefined coordinate system, specifically in such a way that at least one value representing the location information is assigned to a length, relative to a direction substantially along a progression of a route, and/or is assigned to a width, relative to a direction substantially perpendicular to a progression of a route.

In this case, for example, one value representing the location information can specify the location information substantially along a center line of a roadway marking. Another value representing the location information can specify for example the location information depending on the distance of each point substantially perpendicularly with respect to said center line.

Alternatively or additionally, a relative position can be determined and processed further in the predefined coordinate system, wherein the predefined coordinate system preferably relates to a corresponding route segment. The predefined coordinate system and/or the position information can be determined or processed for example in a spatial relation of a local physical roadway property with respect to a longitudinal direction or transverse direction of a route segment within a road and/or lane.

In particular, the predefined coordinate system arises by way of an interpolation from predetermined points or points which are determined by way of a predetermined type. The points of predetermined type can be e.g. prominent points, e.g. vertices or arc radii or arc centers of road curves. The interpolation can be e.g. a piecewise linear interpolation or a second- or third-order interpolation or particularly preferably a spline interpolation.

In accordance with a further advantageous configuration, the route profile data are representative of a progression of the route height of the route segment.

In this case, the progression of the route height can comprise an inherently spatially continuous function that is preferably detected and processed as a spatially discrete function. The function is detected for example depending on the position information, e.g. depending on the relative and/or global position or is assigned to this information.

Alternatively or additionally, a plurality of local physical roadway properties of the route segment can be represented by means of a plurality of, preferably spatially continuously detected, functions. The latter can be processed within the same sequence, also simultaneously or quasi-simultaneously.

This can involve a plurality of, for example fundamentally different, classes of the local physical roadway properties of the route segment.

The progression of the route height can for example also be determined relative to a reference height (as reference variable), formed statistically for example. In this case, the local values of the route height can be represented as an asynchronous function which, together with the data representing the reference height for the corresponding route segment, produces a function of the progression of the route height. In this case, the reference height can for example substantially correspond to a low-pass-filtered value of the progression of the route height, or e.g. to its average value within 10-100 meters, which is determined for example by use of median filtering or other statistical methods. As a result, the spectral distribution can be coded and decoded even more economically, since the very many data-intensive differences between the roadway height progression and a reference variable are detected with a high resolution and form the basis for the determination of the spectral distribution. The reference height can be determined with a very significantly lower amount of data and be assigned to the spectral distribution e.g. for a later more accurate decoding.

In accordance with a further advantageous configuration, the route profile data are representative of a progression of the inclination angles of the route segment.

The progression of the inclination angles can for example also be determined relative to a reference angle, formed statistically for example. In this case, the reference angle, formed statistically for example, can be for example a low-pass-filtered angle, e.g. an average value within 10-100 meters, which is determined for example by use of median filtering or other statistical methods. As a result, the spectral distribution can be coded and decoded even more economically, since only a difference with respect to a predetermined level is stored.

In accordance with a further advantageous configuration, the spectral distribution is assigned to the position information by a spectral distribution function being determined depending on the spectral distribution and the position information, in which spectral distribution function, as argument, a variable that represents the location information is assigned to a predefined coordinate system.

The spectral distribution function thus represents the spectral distribution depending on the variable that represents the location information.

Analogously to the spectral distribution, the spectral distribution function can also be representative of a spatial frequency distribution function and/or with respect to a temporal frequency distribution function.

In this case, the spectral distribution function can be determined by use of a Fourier transformation that represents the spectral distribution with the assigned position information.

Alternatively or additionally, the spectral distribution can also comprise a distribution of a plurality of predefined frequency components, preferably of predetermined elementary functions within a route segment. In this case, a weighting of the distribution of elementary functions within the route profile can also belong to the spectral distribution. In this case, it is not absolutely necessary to determine a spectral distribution function. In this configuration variant, the route profile data can be assigned to a spectral distribution that enables a distribution of specific properties of the route profile in an extremely compact form. In this case, these data can be assigned to the corresponding route segments during the later processing and use of said data. In this case, very many individual properties of the route profile, e.g. more than 10, 20, 1000, 10000 per route profile, which comprises approximately 10 meters, and their respective weighted ratio with respect to one another can be stored in a very compact form or be communicated to an infrastructure device, e.g. to a stationary or mobile back-end system.

During a later use, which can also take place in one or a plurality of other vehicles, a relation between a specific distribution of at least local physical roadway properties of the route segment can be received as particularly compact data and be assigned to one or more route segments, in particular to be traveled along. It is thus possible to use a totality of relevant data in relation to a specific route segment and in relation to one another in an extremely compact form. Consequently, given a predefined data transmission rate, it is possible to achieve a much higher detailing of the data that can be transmitted, or to achieve a drastic saving in terms of the amounts of data to be transmitted.

Consequently, the determination of the spectral distribution, also with regard to an amount of data, is very advantageous since very many location-related parameters that can be reconstructed at a later point in time can be processed.

By way of example, it is possible to transmit the amplitude of the height fluctuations of a roadway segment in a direction of travel and/or transversely with respect to the direction of travel in relation to a plurality of so-called spatial frequencies in the form of extremely compact data. Depending on the vehicle that receives the data later, specific spatial frequency data—relevant to this vehicle—can be processed e.g. in an anticipatory chassis regulation.

In accordance with a further advantageous configuration, the route profile data are determined by way of a vehicle when traveling along the route segment, and the variable that represents the location information is determined depending on movement information of the vehicle.

In this case, the local physical roadway properties can relate for example to the direct surroundings of the vehicle. In this case, at least one local physical roadway property can also be represented by a reaction of the vehicle or of specific parts of the vehicle to said local physical roadway property of the route segment.

The movement information can e.g. also be determined from odometric data of the vehicle, e.g. from the wheel sensors, and/or by means of a global locating system, e.g. GPS.

In accordance with a further advantageous configuration, the route profile data are determined depending on a progression of a mechanical variable within the vehicle.

The mechanical variable can be detected as a, for example, relative mechanical displacement, rotation and/or force action of a component of the vehicle, e.g. of a shock absorber, e.g. in relation to the passenger cell or to vehicle coordinates. In modern vehicles, a plurality of mechanical variables can be detected by specific sensors. In this case, it is possible to use the same sensors already used for other purposes, in particular, which provide measurement values for example for a chassis regulation. In particular, the mechanical variable can be detected as a result of the reaction of a chassis regulation of the vehicle to a mechanical influence. Furthermore, for example a location reference of the progression of the mechanical variable can be determined, e.g. by use of extended navigation data and/or a wheel sensor system, such that the influence of the speed of the vehicle at least partly disappears.

In accordance with a further advantageous configuration, the route profile data are determined depending on a progression of a route relief, in particular of one or more route inclination angles and/or one or more route curvatures within the route segment, said progression being detected using means of the vehicle.

In this case, the route relief should preferably be understood as a variable proportion of the vehicle height within a route segment. This involves height differences of preferably less than +/−5 cm or +/−10 cm. This is particularly advantageous since such height differences can be taken into account or compensated for during a later use of the data with anticipatory chassis functions for a more exact or more efficient regulation. In this case, such a regulation can determine an adaptation of the vehicle actuators to concrete local physical properties at their respective position. It is also possible to carry out an anticipatory driving of the actuators which takes account of the local physical properties in a route segment to be traveled along in the near future (e.g. in the next 0.1-10 seconds). Consequently, the dead time of the actuator system and settling time of mechanical, electronic or hydraulic vehicle systems can advantageously be taken into account as well.

Preferably, the route relief is represented as a location-related function of the, for example relative, local roadway height or route curvature, in particular relative to a reference variable that represents an average height of a route segment or an average route curvature. The latter can also relate to a variable that represents location information, preferably a longitudinal and/or transverse direction of a roadway, or to a sensor position relative to a measured site.

The term route curvature relates to the height curvature, in particular to the centers of curvature above or below the route. In this case, the route curvature can be described by one or more particularly highly pronounced curvatures of the roadway, e.g. as a function of the progression of the curvature in the longitudinal and/or transverse direction of a roadway. This involves curvatures having radii of preferably 0.1-5 meters. This is particularly advantageous since such roadway curvatures can be taken into account or compensated for during a later use of the data with anticipatory stabilizing functions for a more exact or more efficient regulation.

Preferably, the progression of the route relief is detected as an, in particular, time-discrete function. The progression of the route relief can comprise measurement data that are representative of the route height progression and/or route inclination angle progression and are in particular absolute or relative, e.g. angle differences from a sensor perspective.

In particular, it is possible in this case to determine the progression of the route relief from different measurement methods. In this case, the progression of the route relief can be determined, in particular, from a combination of data of a camera, and/or stereo camera, measurement of a mechanical variable at 1-4 wheels of the vehicle and/or inertial sensor system of the vehicle.

In accordance with a further advantageous configuration, a relative position of the vehicle on the route segment is determined, and the route profile data are determined depending on the relative position.

In this case, for example, both a relative position and a global position of the vehicle are determined. In this case, the global position can also be assigned to the local physical roadway property. A further data reduction is possible as a result.

In accordance with a further advantageous configuration, in each case a relative position of a plurality of measurement sites within the route segment is determined, and the route profile data are determined depending on the relative positions of the measurement sites.

In accordance with a further advantageous configuration, the route profile data are determined by a progression of vertical and/or transverse forces acting on the vehicle being determined.

The vertical and/or transverse forces acting on the vehicle reflect for example not only a progression of the route but also what transverse forces influence the vehicle at the relevant site. These vertical and/or transverse forces are thus for example also usable for other purposes, such as, for example, for determining a part's life or a respective remaining part's life of vehicle parts. A remaining part's life of a plurality of different vehicle parts that is determined in this way can be readable and/or representable in numbers, symbols or graphically, e.g. by means of a display device or a diagnosis apparatus. A significantly more efficient utilization of relevant vehicle parts and an improvement in safety are possible as a result. These vertical and/or transverse forces can alternatively or additionally also be used for adaptively setting regulation variables for driving assistance systems.

In accordance with a further advantageous configuration, a measure of similarity is determined between one or more data segments of the route profile data and one or more predefined patterns that are representative of predefined route profile patterns, and the data segment is assigned to one of the predefined patterns depending on the determined measure of similarity.

In this case, a data segment can be representative of a portion of the route profile data, for example a geometrical region of the route segment, and comprises e.g. 10 cm-10 meters.

The measure of similarity can comprise a similarity of a represented physical form of a site within the route segment. Such an, in particular prominent, data segment can correspond e.g. to one of a plurality of typical forms of a typical roadway unevenness, e.g. a boundary between concrete slabs, leveled edge of the roadway, etc. or else to a progression of a curb or a crash barrier.

The assignment of the data segment to predefined patterns is preferably carried out depending on the maximum determined measure of similarity, e.g. during the comparison of measures of similarity of a data segment and a plurality of patterns available for selection.

In accordance with a further advantageous configuration, determining the spectral distribution is carried out in the context of a predefined audio standard.

For this purpose, the system comprises, in particular, a device for compressing audio data of a predefined audio format, which is configured to process the route profile data.

In this case, in the context of determining the spectral distribution, for example, data can be modified in such a way that a location-related function is assigned in a manner corresponding to a predefined assignment to time information, preferably in such a way that a length is assigned in a specific proportion to temporal units and/or the resulting time information is processed and/or stored by means of one or more devices.

The predefined audio standard comprises for example MP-3 or similar audio standards. In the case of such audio standards, the storage, processing and also wireless transmission of files are extremely expedient because the corresponding standards are established and because the coders and decoders, including as hardware, in the meantime have become very expedient and there is very high compatibility, e.g. also with mobile radio, internet platforms and interfaces.

By way of example, MP-3 streaming is standardized very well, thus affording advantages in handling.

In accordance with a further advantageous configuration, the spectral distribution is determined in such a way that it represents multi-channel data, wherein one channel of the multi-channel data is representative of a first route strip, and one channel is representative of a second route strip.

The respective route strip comprises for example a traffic lane or an entire road width, for example if a stereo camera and/or a laser scanner are/is used for determining the route profile data, or a width of a vehicle tire, for example if a mechanical variable of the vehicle is used for determining the route profile data.

In accordance with a further advantageous configuration, determining the spectral distribution is carried out in the context of a predefined video standard. A very detailed, multidimensional and at the same time very compact representation of the spectral distribution can be achieved as a result.

The predefined video standard comprises for example MPEG, MP4 or similar video standards. By way of example, the local physical roadway property is coded instead of pixel values. By way of example, as in the case of MP4, only the differences within the route are coded. By way of example, three physical roadway properties can be coded instead of RGB pixel parameters. The data packets determined in this case do not correspond in this case to a multimedia contents visible or directly perceptible to a human being.

The system comprises for this purpose, in particular, a device for compressing video data of a predefined video format, which is configured to process the route profile data.

In accordance with a further advantageous configuration, reduced route profile data are determined depending on a progression of the route profile data by the quantization of the route profile data and/or the number of data of the route profile data which are assigned to a temporal unit, and/or a spatial unit, being set depending on the progression of the route profile data, and the spectral distribution is determined depending on the reduced route profile data.

It is thus possible that sites at which for example the local physical roadway property changes little are resolved less exactly and sites relevant to the vehicle, e.g. dangerous sites, e.g. a crack on an interstate highway or a large pothole, are resolved very exactly. A further data reduction can be achieved as a result.

Particularly preferably, it is also possible to determine items of position information concerning one or more sites of a route with a specific pattern or a pattern of a predetermined type, preferably from two or more different classes of the route profile data, which represent different local physical properties. It is thus also possible to determine sites which are relevant or critical e.g. for a vehicle journey and which result from a superposition of properties that can inherently be tolerated, e.g. on the one hand: low coefficient of friction, and on the other hand: roadway inclination.

In this case, one or more vehicle systems, in particular chassis or driver assistance systems, can be controlled during a later use of the stored data depending on such sites.

In accordance with a further advantageous configuration, reduced route profile data are determined depending on at least one or more predefined thresholds and depending on the route profile data by data that are representative of non-perceptible physical properties of the route segment being filtered out of the route profile data, and the spectral distribution is determined depending on the reduced route profile data.

As a result, it is possible to achieve a further great reduction in the amount of data, and a saving of hardware performance capability in the vehicle.

In accordance with a further advantageous configuration, one or more thresholds correspond to one or more perceptibility thresholds, wherein at least two thresholds are different for different spectral components.

In accordance with a further advantageous configuration, a vehicle profile is provided, and the route profile data are determined depending on the vehicle profile, specifically in such a way that they are representative of the local physical property of the route segment vehicle-independently.

The vehicle profile includes, for example, the sensitivity with respect to different spectral components and/or ranges of the local physical property. Preferably, the sensitivity can comprise a vibration transmission function from the roadway to the passenger cell. In particular, the vibration transmission function can also be speed-dependent.

By virtue of the determination in such a way that that the route profile data are representative of the local physical property of the route segment vehicle-independently, the data are universal and can serve to determine the effects of the route on, for example, a different vehicle entirely.

In accordance with a further advantageous configuration, the route profile data also represent a variable proportion of local physical roadway properties of a route segment in the form of a distribution function of the route moisture and/or distribution function of the route temperature and/or distribution function of the coefficient of friction.

In accordance with a second aspect, the invention is also distinguished by a decoding method. The invention is furthermore distinguished by a system corresponding to the decoding method. A spectral distribution with assigned position information is provided, wherein the position information is representative of a global position of a route segment. Depending on the spectral distribution, route profile data are determined, which are assigned to the spectral distribution and which are representative of a local physical property of the route segment.

As a result, the spectral distribution with the assigned position information can be processed further in a simple manner, for example in order to use the data of the spectral distribution for driver assistance systems and/or for other functions already described.

In accordance with a third aspect, the invention is distinguished by a coding and decoding method. The invention is furthermore distinguished by a system corresponding to the coding and decoding method. A method in accordance with the first aspect or in accordance with an advantageous configuration of the first aspect is carried out. The spectral distribution with the assigned position information is provided. Depending on the spectral distribution, route profile data are determined, which are assigned to the spectral distribution and which are representative of a local physical property of the route segment.

In accordance with a fourth aspect, the invention is distinguished by a coding and decoding method. The invention is furthermore distinguished by a system corresponding to the coding and decoding method. At least one method in accordance with the first aspect or in accordance with an advantageous configuration of the first aspect is carried out in a first vehicle. The spectral distribution with assigned position information is provided. At least the route profile data which are assigned to the spectral distribution and which are representative of a local physical property of the route segment are determined in a second vehicle depending on the spectral distribution.

In accordance with one advantageous configuration, the spectral distributions of a plurality of first vehicles are aggregated, and the aggregated spectral distributions are provided for one or more second vehicles.

In accordance with a further advantageous configuration, at least one of the following method steps is carried out in the second vehicle depending on the spectral distribution:
- active regulation of vertical-dynamic damping and/or acceleration effect on the passenger cell of the second vehicle,
- variation of the forces of the steering wheel feedback and/or coupling of the second vehicle, and/or
- variation of at least partly automatic longitudinal guidance and/or transverse guidance of the second vehicle is varied.

One particular advantage arises in particular from the linking of the data that represent permanent and/or variable physical properties. A further particular advantage arises from the linking of local data of the route profile with global properties relating e.g. to a road segment.

In accordance with a further aspect, the invention is distinguished by a computer program, wherein the computer program is configured to carry out the method for processing data of a route profile or an advantageous configuration of the method for processing data of a route profile, the coding method or an advantageous configuration of the coding method and/or the coding and decoding method or an advantageous configuration of the coding and decoding method on a data processing device.

In accordance with a further aspect, the invention is distinguished by a computer program product comprising executable program code, wherein the program code, when executed by a data processing device, performs the method for processing data of a route profile or an advantageous configuration of the method for processing data of a route profile, the coding method or an advantageous configuration of the coding method and/or the coding and decoding method or an advantageous configuration of the coding and decoding method.

The computer program product comprises, in particular, a medium which is readable by the data processing device and on which the program code is stored.

In accordance with a further aspect of the invention, all or a plurality of essential steps of the method are carried out within one vehicle or a plurality of vehicles.

The vehicle in the context of the invention is preferably a motor vehicle or motorcycle. A number of advantages discussed above and a number of further advantages comprehensible to the person skilled in the art are thus afforded. The vehicle can also be a watercraft, wherein a part of the seabed and/or of the water layers corresponds to the route; they can be utilized economically, for example. The vehicle can also be an aircraft or spacecraft, wherein the corresponding route is a part of a planetary surface, atmospheric layers or of the planetary layers. Such applications, e.g. for detecting and transmitting the local physical properties (resolved down to fine details) of planets or other celestial bodies, are very advantageous because the route profile data can be transmitted in an extremely compact form.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a flow diagram of a program for coding and decoding.

DETAILED DESCRIPTION OF THE DRAWINGS

FIG. 1 shows a flow diagram of a program for coding and decoding. The program can be processed by a vehicle control device SV, for example, which has, in particular, at least one computing unit, a program and data memory and, for example, one or more communication interfaces, and which is arranged in a vehicle. The program and data memory and the computing unit of the vehicle control device can be embodied in one structural unit and/or in a manner distributed among a plurality of structural units.

The program can alternatively or additionally be processed by way of an external control device, for example, which has, in particular, at least one computing unit, a program and data memory and, for example, one or more communication interfaces, and which is arranged for example in a server, in particular a back-end server BS, and/or a further vehicle. The program and data memory and the computing unit of the external control device can be embodied in one structural unit and/or in a manner distributed among a plurality of structural units.

The program can also be processed in a distributed manner by way of the vehicle control device SV and the external control device. In this regard, in particular, data can be determined in the vehicle control device SV and be transmitted to the external control device and be processed further there.

A system for coding and/or decoding and/or, in particular, for processing data of a route profile that represents local physical roadway properties of a route segment, thus comprises, in particular, the vehicle control device SV and/or the external control device.

After the program has been started, the program is continued in a step S1 once variables have been initialized, for example.

Step S1 involves determining position information, which is representative of a global position of the route segment. For this purpose, in particular, a position of the vehicle is determined, for example by way of a satellite-based navigation system, such as e.g. GPS. In addition, for example, it is possible to determine the position of the vehicle within a lane, e.g. also relative to markings and/or roadway boundaries.

A step S3 involves determining route profile data that are representative of local physical roadway properties of the route segment. In this case, the route profile data that are representative of local physical roadway properties of the route segment are determined in the form of an asynchronous function. In this example, the asynchronous function represents a locally variable compartment of a variable that is representative of local physical roadway properties of the route segment, in a time-discrete form.

The direct proportion of said variable is likewise determined for the route segment. It can be assigned to the route segment with, in each case, only one numerical value or vector value and can be processed further and stored together with respect to the spectral distribution determined in the context of the method. In comparison with the asynchronous proportion of the route profile data, the storage of the direct proportion requires only a fraction of the amount of data that would be required to store all the local route data. Therefore, this can also be stored or processed with the aid of conventional methods.

For this purpose, in particular, in a step S3A, for example, a direct contactless profile detection of the route segment is determined via a perceptive sensor system, for example by use of a stereo camera, a laser scanner, a motion stereo method and/or a monocamera.

Particularly preferably, the route profile data can be determined by a device which:
  emits electromagnetic waves, e.g. radar waves or light having visible or invisible spectral components, or emits pressure waves, e.g. ultrasonic waves, and
  is configured to detect and evaluate the reflection of the waves from the route.

Alternatively or additionally, for this purpose, a step S3B involves determining for example a profile detection through physical influences on the vehicle, for example by means of detected accelerations and/or forces on the passenger cell or individual parts of the vehicle, e.g. axles of the vehicle.

Alternatively or additionally, the route profile data determined in step S3B are converted into a spatial function in a step S3C.

In an optional step S5, the route profile data are transferred into a predefined coordinate system, for example along and/or transversely with respect to a section or lane progression.

In an optional step S7, reduced route profile data are determined depending on at least one or a plurality of predefined thresholds and depending on the route profile data by virtue of data that are representative of physical properties of the route segment that are not perceptible (e.g. by the kinesthetic perception of the driver of the vehicle) being filtered out of the route profile data.

In an optional step S9, a measure of similarity is determined between one or more data segments of the route profile data and one or more predefined patterns that are representative of predefined route profile patterns, and the data segment is assigned to one of the predefined patterns depending on the determined measure of similarity. The predefined patterns comprise, for example, predefined gap functions, angle progressions and/or predefined standard potholes.

An optional step S11 involves determining whether the route profile data have repeated and/or similar sequences and the repeated and/or similar sequences are coded as repetition, in particular by applying a Huffman coding.

In an optional step S13 a vehicle profile is provided, and the route profile data are determined depending on the vehicle profile, specifically in such a way that they are representative of the local physical property of the route segment vehicle-independently. Step S13 can be processed in particular by way of the external control device.

In a step S15, a spectral distribution is determined depending on the route profile data and/or the reduced route profile data, in relation to a variable that represents location information, and the spectral distribution is assigned to the position information.

For this purpose, in particular, in a step S15A, a Fourier analysis is applied, preferably as a spectral representation of the route profile data as a spatial function.

In particular, the spectral distribution function is determined by use of time-discrete methods which are known per se and which yield an approximation to the value of the following formula:

$$f(t) = \frac{1}{\sqrt{2\pi}} \int_{-\infty}^{\infty} a(\omega) e^{i\omega t} \, d\omega$$

where $$a(\omega) = \frac{1}{\sqrt{2\pi}} \int_{-\infty}^{\infty} f(t) e^{-i\omega t} \, dt$$

where $\omega$=angular frequency, t=time, f(t)=signal and $\alpha(\omega)$=Fourier-transformed angular frequency.

In particular, the spectral distribution is determined by use of applying a location-discrete cosine transformation in a step S15B.

In an optional step S16, the spectral distribution with the assigned position information is permanently stored for example in the vehicle and/or in the back-end sever BS. Preferably, a comparison with existing data is carried out and only difference data D that differ from the data already present are stored.

In an optional step S25, the spectral distribution with the assigned position information can be used for example for vehicle functions.

In a simplified variant of the method, it is also possible to determine a discretely represented spectral distribution that comprises e.g. only more than 3 and less than 30 different spectral components of the local physical roadway properties of each of a plurality of route segments of the route. In this case, these spectral components can be representative of a spatial frequency band.

In particular, for this purpose, in a step S23, the spectral distribution is decoded again by virtue of the fact that depending on the spectral distribution, route profile data are determined, which are assigned to the spectral distribution and which are representative of a local physical property of the route segment. In this case, in this example, a step (not explicitly illustrated graphically) of assigning the decoded variable compartment of the route profile data, which are representative of local physical roadway properties of the route segment, to a reference variable is carried out. In this case, the reference variable is the reference variable determined during the coding or a reference variable determined using means of a second vehicle. The reference variable can also be a global variable that applies to a route segment or to a route.

In this case, the spectral distribution or spectral distribution function can be stored together with the position information assigned thereto and, if appropriate, also with the function of the reference variable as data packets and be used at a significantly later point in time.

In this case, from the data packets it is possible to determine the route profile data with respect to predefined position information or position information with respect to the predefined route profile data.

The method can likewise comprise determining one or a plurality of items of position information comprising to a specific pattern or to a pattern of a specific type which is formed by local physical roadway properties. In this case, such patterns can particularly preferably comprise different classes of the route profile data.

The method can be applied to two or more different classes of the route profile data, e.g.:
progression of the local roadway height and/or roadway curvature,
progression of the transverse forces which act on a vehicle when traveling along a route segment, which are preferably normalized according to the respective speed value of the vehicle,
progression of the local coefficient of friction,
progression of the local temperature of the roadway,
progression of at least one mechanical force that acts on a component of the chassis of the vehicle.

LIST OF REFERENCE SIGNS

BS back-end server
D difference data
SV vehicle control device

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling vehicle functions in accordance with a route profile that represents local physical roadway properties of a route segment, the method comprising the steps of:
detecting, via one or more vehicle-based sensors, a local physical roadway property of the route segment on which a vehicle is travelling;
determining position information representative of a global position of the route segment;
determining, based on the detection, route profile data representing the local physical roadway properties of the route segment;
determining a spectral distribution of the route profile data, by applying a spectral function to the route profile data, in relation to a variable that represents location information;
assigning the spectral distribution to the position information;
providing the spectral distribution and position information to a vehicle function control unit; and
controlling vehicle functions, via the vehicle function control unit, based on the spectral distribution and position information, to account for the local physical roadway properties of the route segment.

2. The method as claimed in claim 1, further comprising:
determining an asynchronous function that represents the route profile data.

3. The method as claimed in claim 1, wherein the spectral distribution is representative of a spatial frequency distribution.

4. The method as claimed in claim 1, wherein the spectral distribution is representative of a temporal frequency distribution.

5. The method as claimed in claim 1, wherein the spectral distribution is assigned to the position information by a predefined coordinate system such that at least one value representing the location information:
(i) is assigned to a length, relative to a direction substantially along a progression of a route, and/or
(ii) is assigned to a width, relative to a direction substantially perpendicular to a progression of a route.

6. The method as claimed in claim 1, wherein the route profile data are representative of a progression of a route height of the route segment.

7. The method as claimed in claim 1, wherein the route profile data are representative of a progression of an inclination angle of the route segment.

8. The method as claimed in claim 1, wherein the spectral distribution is assigned to the position information by a spectral distribution function being determined depending on the spectral distribution and the position information.

9. The method as claimed in claim 1, wherein the route profile data are determined by a vehicle when traveling along the route segment, and the variable that represents the location information is determined depending on movement information of the vehicle.

10. The method as claimed in claim 9, wherein the route profile data are determined depending on a progression of a mechanical variable within the vehicle.

11. The method as claimed in claim 9, wherein the route profile data are determined depending on a progression of a route relief as detected using the vehicle.

12. The method as claimed in claim 9, wherein a relative position of the vehicle on the route segment is determined, and the route profile data are determined depending on the relative position.

13. The method as claimed in claim 9, wherein, in each case, a relative position of a plurality of measurement sites within the route segment is determined, and the route profile data are determined depending on the relative positions of the measurement sites.

14. The method as claimed in claim 9, wherein the route profile data are determined by a progression of vertical and/or transverse forces acting on the vehicle being determined.

15. The method as claimed in claim 1, wherein
a measure of similarity is determined between one or more data segments of the route profile data and one or more predefined patterns that are representative of predefined route profile patterns, and
the data segment is assigned to one of the predefined patterns depending on the determined measure of similarity.

16. The method as claimed in claim 1, wherein determining the spectral distribution is carried out in the context of a predefined audio standard.

17. The method as claimed in claim 1, wherein the spectral distribution is determined such that it represents multi-channel data, wherein one channel of the multi-channel data is representative of a first route strip, and one channel is representative of a second route strip.

18. The method as claimed in claim 1, wherein determining the spectral distribution is carried out in the context of a predefined video standard.

19. The method as claimed in claim 1, wherein
reduced route profile data are determined depending on: (i) a progression of the route profile data by quantization of the route profile data, and/or the number of data of the route profile data which are assigned to a temporal unit, and/or (ii) a spatial unit, being set depending on the progression of the route profile data, and
the spectral distribution is determined from the reduced route profile data.

20. The method as claimed in claim 1, wherein
reduced route profile data are determined depending on at least one or more predefined thresholds and depending on the route profile data by data that are representative of non-perceptible physical properties of the route segment being filtered out of the route profile data, and
the spectral distribution is determined from the reduced route profile data.

21. The method as claimed in claim 20, wherein
one or more thresholds correspond to one or more perceptibility thresholds, wherein at least two thresholds are different for different spectral components.

22. The method as claimed in claim 1, wherein
a vehicle profile is provided, and
the route profile data are determined depending on a vehicle profile, such that they are representative of the local physical property of the route segment vehicle-independently.

23. The method as claimed in claim 1, wherein the route profile data also represent a variable proportion of local physical roadway properties of a route segment, in the form of a:
distribution function of route moisture,
distribution function of route temperature, and/or
distribution function of coefficient of friction.

24. The method as claimed in claim 1, further comprising the steps of:
providing the spectral distribution with the assigned position information, and
depending on the spectral distribution, determining route profile data, which are assigned to the spectral distribution and which are representative of a local physical property of the route segment.

25. The method as claimed in claim 1, further comprising the steps of:
providing the spectral distribution with assigned position information determined in a first vehicle, and
determining at least the route profile data which are assigned to the spectral distribution and which are representative of a local physical property of the route segment in a second vehicle depending on the provided spectral distribution from the first vehicle.

26. The method as claimed in claim 25, further comprising:
aggregating the spectral distributions of a plurality of first vehicles, and
providing the aggregated spectral distributions for one or more second vehicles.

27. The method as claimed in claim 26, wherein at least one of the following method steps is carried out in the second vehicle depending on the spectral distribution:
active regulation of vertical-dynamic damping and/or acceleration effect on the passenger cell of the second vehicle,
variation of forces of the steering wheel feedback and/or coupling of the second vehicle,
variation of at least partly automatic longitudinal guidance and/or transverse guidance of the second vehicle.

28. A non-transitory computer program product comprising executable program code, wherein the program code, when executed by a data processing device, performs the method for controlling vehicle functions in accordance with a route profile that represents local physical roadway properties of a route segment, the method comprising the steps of:
detecting, via one or more vehicle-based sensors, a local physical roadway property of the route segment on which a vehicle is travelling;
determining position information representative of a global position of the route segment;
determining, based on the detection, route profile data representing the local physical roadway properties of the route segment;
determining a spectral distribution of the route profile data, by applying a spectral function to the route profile data, in relation to a variable that represents location information;
assigning the spectral distribution to the position information;
providing the spectral distribution and position information to a vehicle function control unit; and
controlling vehicle functions, via the vehicle function control unit, based on the spectral distribution and position information, to account for the local physical roadway properties of the route segment.

* * * * *